E. E. W. ANDERSON.
GAS METER.
APPLICATION FILED JAN. 24, 1919.

1,421,138.

Patented June 27, 1922.

Inventor:
Emil Einar Wilhelm Anderson
By George Bayard Jones
Attorney

UNITED STATES PATENT OFFICE.

EMIL EINAR WILHELM ANDERSON, OF STOCKHOLM, SWEDEN.

GAS METER.

1,421,138.  Specification of Letters Patent.  Patented June 27, 1922.

Application filed January 24, 1919. Serial No. 272,954.

(GRANTED UNDER THE PROVISIONS OF THE ACT OF MARCH 3, 1921, 41 STAT. L., 1313.)

*To all whom it may concern:*

Be it known that I, EMIL EINAR WILHELM ANDERSON, a subject of the King of Sweden, residing at Stockholm, in the Kingdom of Sweden, have invented a new and useful Improvement in Gas Meters (for which I have filed applications in Sweden March 5, 1917, Patent No. 50,112, granted September 15, 1921, and in Denmark November 18, 1918, Patent No. 25,074, granted September 16, 1919), of which the following is a specification.

The present invention relates to a gas meter consisting in a well-known manner of a bellows, a membrane, or the like arranged in a casing and dividing said casing into two measuring chambers, which chambers are alternately placed into communication with the inlet and the outlet of the meter by valves operated by the bellows or the membrane.

The purpose of the present invention is to provide a dry gas meter of a simple, inexpensive and reliable construction. The novel gas meter is broadly characterized by this that the two measuring chambers are arranged in the casing in such manner that one wall of the casing forms the side-wall of both measuring chambers, and that all valves, inlet as well as outlet valves, are arranged directly in said side-wall. In this manner it is possible to place the valves adjacent one another so that no long gas channels are made necessary, and to connect the valves with one another by simple levers so that the operation will be the most reliable possible.

Figure 1:
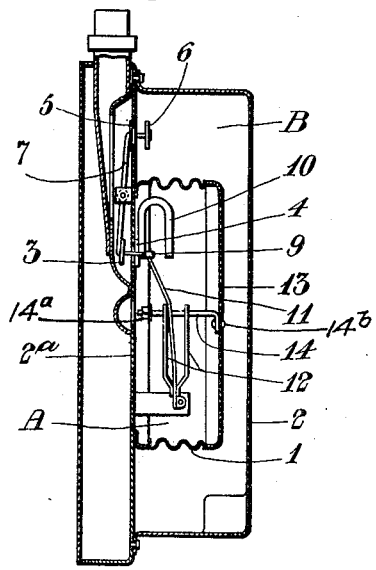
Figure 2:
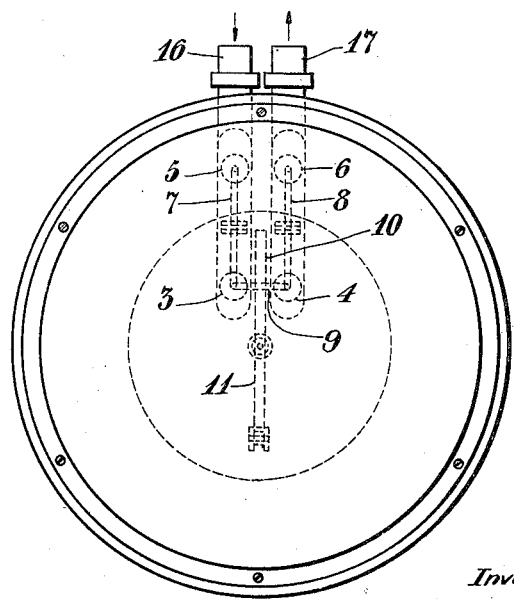

An embodiment of the invention is illustrated in the attached drawing. Fig. 1 shows a section of a gas meter according to the invention, and Fig. 2 shows a front view of the same.

The bellows 1 is mounted in the casing 2 in such manner as to divide the same into two measuring chambers, an inner chamber A and an outer chamber B, and so that one wall $2^a$ of the casing forms the side-wall of both measuring chambers, the central portion of said wall forming the side-wall of the inner chamber A, and the outer portion of the wall forming the annular side-wall of the chamber B. In this side-wall all gas valves are located, said valves being formed as simple disk valves in the embodiment illustrated. The gas meter is provided with two pairs of valves the one valve 3 of the one pair forming the inlet valve for the gas to, and the other valve 4 the outlet valve from, the inner measuring chamber A, while the one valve 5 of the second pair forms in similar manner the inlet valve for the gas to, and the other valve 6 the outlet valve from the outer measuring chamber B. The valves are arranged in such manner that the inlet valve 3 to the chamber A and the outlet valve 6 from the chamber B are opened simultaneously, when the two other valves are closed, and vice versa. For this purpose the valve bodies of the two inlet valves 3 and 5 are secured to a pivoted lever 7, and the valve bodies of the two outlet valves 4, and 6 are secured to another pivoted lever 8. The said levers are connected by means of the spindles of the valves 3 and 4 with the armature 9 of a horse-shoe magnet 10. It will be observed that the valve bodies of the inlet valves 3 and 5 are located on the outer side of the wall $2^a$, while the valve bodies of the outlet valves 4 and 6 are located on the inner side of the wall and are connected with the lever 8 by means of their spindles which pass through the valve openings in the wall. The armature 9 is maintained between the shanks of the magnet 10 by an arm 11. Two springs 12 are secured to the arm 11, one spring being on each side of the arm. These springs are actuated by an arm 14 secured to the movable bottom 13 of the bellows. When the bottom 13 moves to the right, carrying with it arm 14 which passes through apertures (not shown) in the ends of springs 12, the nut $14^a$ attached to the end of said arm 14 forces the left hand spring to the right (as viewed in Fig. 1) against arm 11 and thus moves armature 9 until it is attracted by the right shank of the magnet 10. When the bottom is moved to the left by the inflowing gas in the measuring chamber B, arm 11 is also moved to the left by the right hand spring 12 which is actuated by contact with rivet $14^b$ at the base of the said arm 14.

When the valves 3 and 6 are open, as indicated in the drawing, and the gas flows into the meter through the inlet 16, the gas will flow through the open valve 3 into the inner measuring chamber A, and will fill this chamber and move the bottom 13 to the right in Fig. 1. On account hereof the arm 14 forces the left-hand spring 12 against the arm 11, so that this arm is turned to the right, with the result that the armature 9 is drawn from the left-hand shank of the magnet and is attracted by the right-hand shank in Fig. 1. On account hereof all valves are switched over in such manner that the valves 3 and 6 become closed and the valves 4 and 5 become opened. The gas will then flow from the inlet 16 through the valve 5 into the outer measuring chamber B, and will fill this chamber and compress the bellows so that the gas in the measuring chamber A is forced out through the valve 4 and through the outlet 17, until the bottom 13 of the bellows again moves the armature 9 to the left with the aid of the arm 14, the right-hand spring 12 and the arm 11, so that the armature is attracted by the left-hand shank of the magnet and again effects the switching of all valves. When a new quantity of gas flows into the chamber A a corresponding quantity of gas will be forced out from the chamber B so that the quantity of gas flowing through the meter is dependent on the movements of the bellows.

By providing the magnet 10 it is possible to effect an instantaneous switching of the valves so that the valves can not stop in a position in which all valves are partly open. Finally, by the described arrangement of the valves the advantage is also attained that the meter may be made considerably smaller than meters as heretofore used so that it requires less space.

I claim:

1. In a gas meter the combination of a casing having a flexible partition dividing said casing into an inner and outer measuring chamber, valve openings in one side wall of said casing for said inner chamber, other valve openings in said side wall for said outer chamber, closing members for said valve openings, and means operable by the movement of said flexible partition for actuating said closing members.

2. In a gas meter, the combination of a casing, a flexible partition dividing said casing into two measuring chambers, one wall of said casing forming the side-wall of both measuring chambers, inlet and outlet valves for both said chambers arranged directly in said side-wall, the valve bodies of the inlet valves being located at one side of said side-wall and the valve bodies of the outlet valves being located at the other side of said side-wall, a pivoted lever supporting at each end a valve body of an inlet valve, a pivoted lever supporting at each end a valve body of an outlet valve, and means actuated by said flexible partition for operating said levers.

3. In a gas meter the combination of a casing having a flexible partition dividing said casing into two measuring chambers, inlet and outlet valve seats for each of said chambers located in one wall of said casing, outlet and inlet valves operable with respect to said valve seats, a magnet, and means controlled by said flexible partition and cooperating with said magnet for effecting the operation of said valves.

4. In a gas meter the combination of a casing having a flexible partition dividing said casing into two measuring chambers, an inlet and outlet valve for each of said chambers, said inlet valves being mounted on a pivoted lever, said outlet valves being mounted on a second pivoted lever, a magnet and means cooperating therewith and actuated by the movement of said flexible partition for opening and closing said valves.

EMIL EINAR WILHELM ANDERSON.